(12) United States Patent
Oneda

(10) Patent No.: US 6,213,390 B1
(45) Date of Patent: *Apr. 10, 2001

(54) TRANSACTION METHOD OF ELECTRONIC MONEY SYSTEM

(75) Inventor: Hideo Oneda, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/713,532

(22) Filed: Sep. 13, 1996

(30) Foreign Application Priority Data

Mar. 19, 1996 (JP) .................................................. 8-062875

(51) Int. Cl.[7] ...................................................... G06F 17/60
(52) U.S. Cl. ........................................... 235/379; 235/375
(58) Field of Search .................................. 235/380, 375, 235/379, 381; 902/24

(56) References Cited

U.S. PATENT DOCUMENTS

| | | | | |
|---|---|---|---|---|
| 4,839,504 | * | 6/1989 | Nakano | 235/379 |
| 5,350,906 | * | 9/1994 | Brody et al. | 235/379 |
| 5,450,938 | * | 9/1995 | Rademacher | 235/381 X |
| 5,453,601 | * | 9/1995 | Rosen | 235/379 |

* cited by examiner

Primary Examiner—Karl D. Frech
(74) Attorney, Agent, or Firm—Staas & Halsey LLP

(57) ABSTRACT

An IC card is issued from a retail trade to a consumer. The consumer withdraws a necessary money amount from an own bank account and stores into the issued IC card. At the same time, the same money amount as the withdrawal money amount of the consumer is transferred to a bank account of the retail trade. Further, when the consumer buys goods from the retail trade or receives a presentation of a service, a requested money amount is paid by using the IC card.

25 Claims, 13 Drawing Sheets

| ITEMS | UPDATING SOURCE | |
|---|---|---|
| | BANK | POS |
| ADVANCE MONEY AMOUNT D1 | 1 | 0 |
| WITHDRAWAL DATE D2 | 1 | 0 |
| USE MONEY AMOUNT D3 | 0 | 1 |
| FIRST USE ACCUMULATION D4 | 1 | 1 |
| USE DATE D5 | 0 | 1 |
| USE LOCATION D6 | 0 | 1 |
| BALANCE D7 | 1 | 1 |
| ADVANCE MONEY AMOUNT D8 | 1 | READ ONLY |
| WITHDRAWAL DATE D9 | 1 | READ ONLY |
| SECOND USE ACCUMULATION D10 | 1 | READ ONLY |
| POINT SERVICE D11 | 0 | 1 |
| DISCOUNT SERVICE D12 | 0 | 1 |

D8, D9, D10 ARE FOR PREVENTING FALSIFICATION

F I G. 1 0
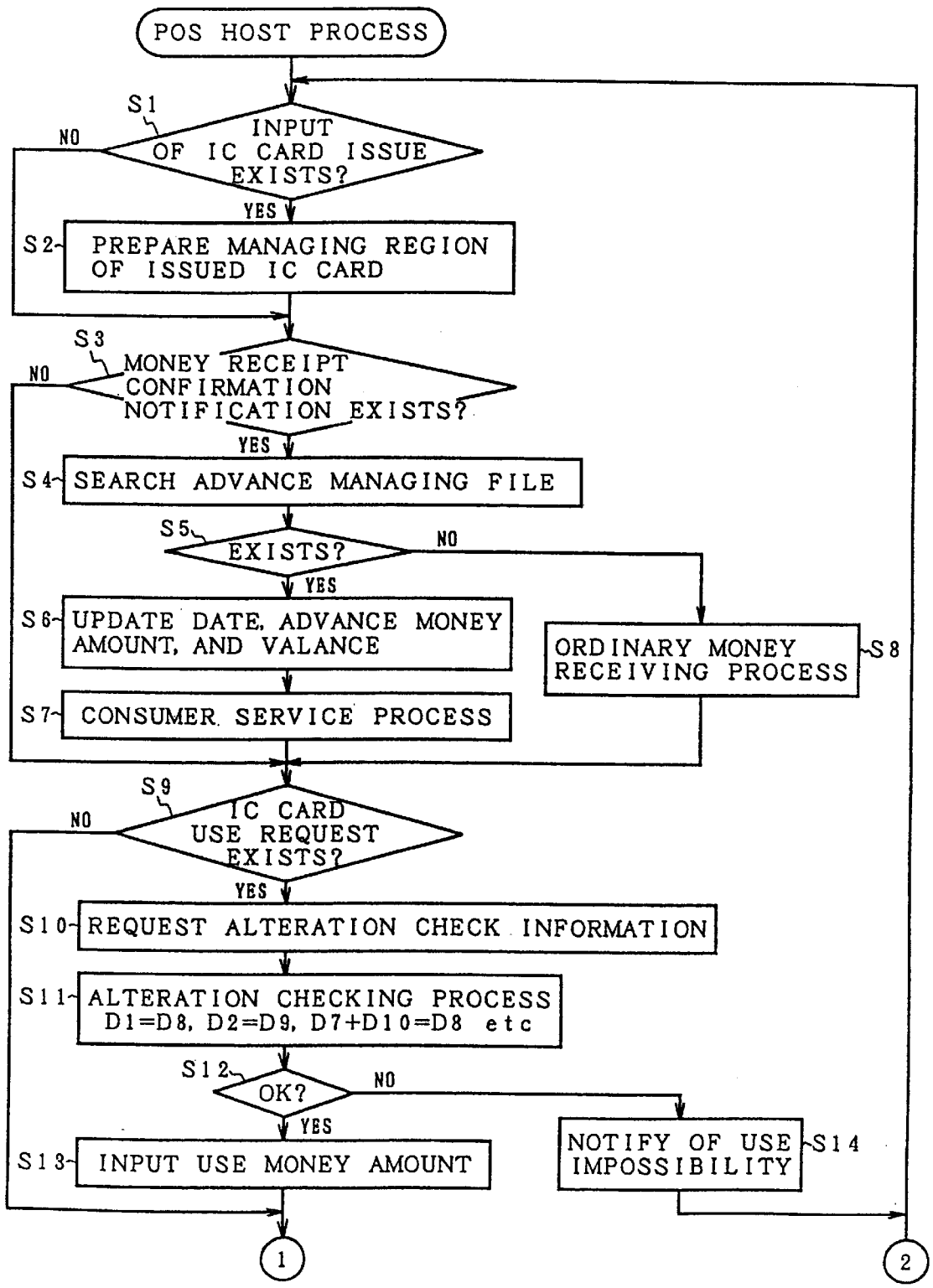

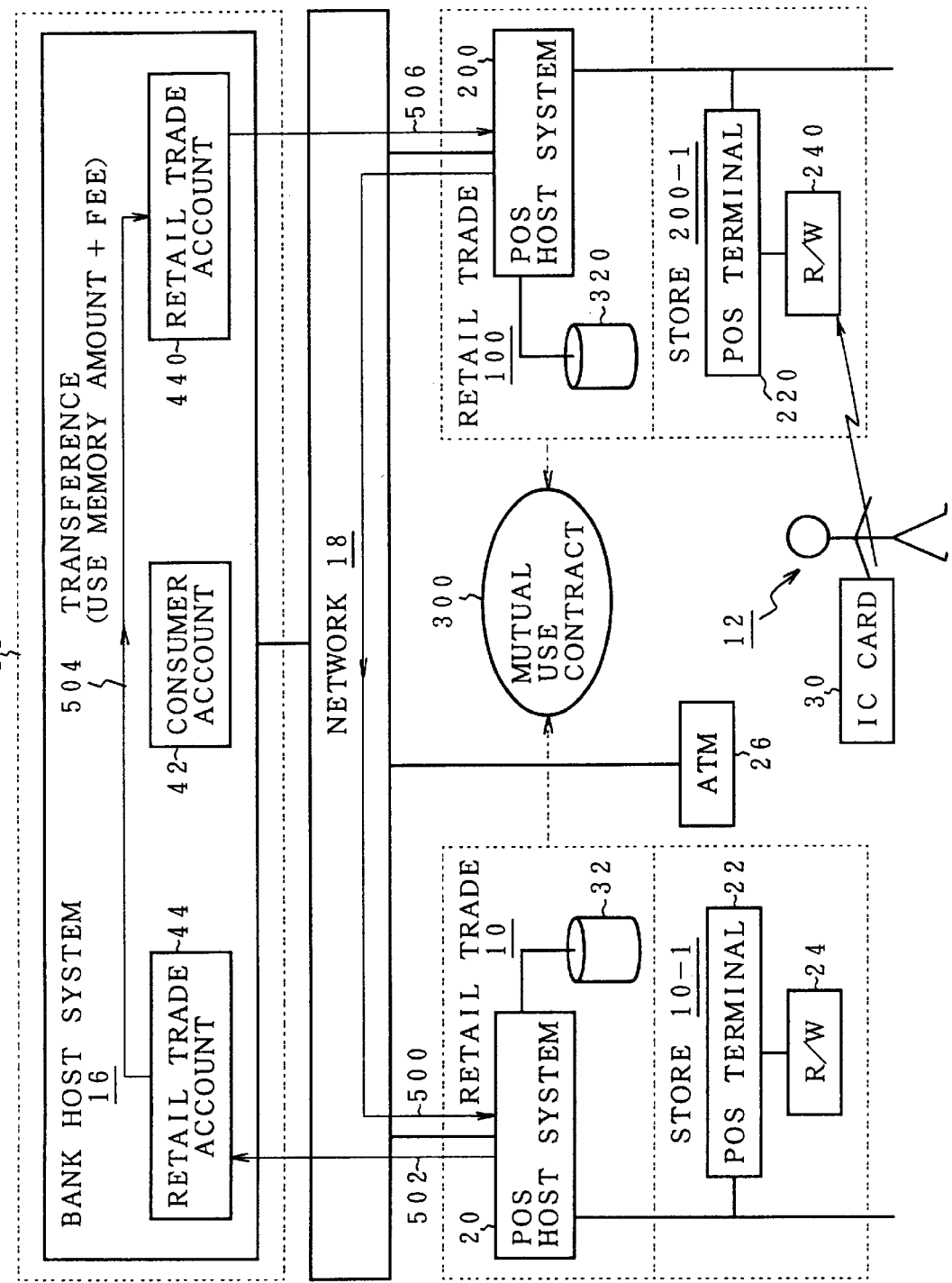

TRANSACTION METHOD OF ELECTRONIC MONEY SYSTEM

BACKGROUND OF THE INVENTION

The invention relates to a transaction method of an electronic money system for performing a cash transaction by using electronic money withdrawn from a bank account to an IC card and, more particularly, to a transaction method of an electronic money system suitable for buying and selling of goods in a retail trade such as department store, supermarket, or the like.

In recent years, an IC card which has been standardized by banks and a terminal equipment such as ATM, CD, counter equipment, etc. from which cash can be withdrawn by the IC card are rapidly being put into practical use. The IC card which is issued from the bank has a lending region in which an additional value by enabling the IC card to be used in addition to a bank using region according to a bank standard format. By using the lending region of the IC card, therefore, various use forms using a computer network of an on-line host system of the bank provided for the IC card can be expected.

On the other hand, in a retail trade such as department store, supermarket, convenience chain store, or the like, a POS system for managing sales has already been established. By providing a reader/writer function of the IC card for a terminal of the POS system, an electronic money system to buy goods by using the IC card can be constructed.

FIG. 1 (PRIOR ART) is a block diagram of an electronic money system using an IC card which is generally proposed at present. First, a bank host system 1016 is provided for a bank 1014. Terminal equipment such as ATM (automatic cash transaction machine) 1026, CD (cash dispenser) 1028, and the like which are provided by the bank 1014 are connected to the bank host system 1016 through a network 1018. The ATM 1026 and CD 1028 can use an IC card 1030 which is issued by the bank to a consumer 1012 and can execute an ordinary transaction such as defrayal, savings, transference, balance inquiry, etc. for a consumer account 1044. Further, there are provided electronic money services such that a necessary money amount is withdrawn from the consumer account 1044 to the IC card 1030 and the money amount withdrawn to the IC card 1030 can be used as electronic money in a cash transaction. When the consumer 1012 withdraws a necessary money amount from the consumer account 1044 to the IC card 1030, the bank host system 1016 transfers the money amount withdrawn from the consumer account 1044 to a pool account 1045 for electronic money services and separately manages it. In order to enable a transaction by the electronic money of the IC card to be performed, in a retail trade 1000, a reader/writer 1024 which can cope with the IC card 1030 is installed in a POS terminal 1022 of a shop, a store, or the like connected to the POS host system 1020. When the consumer 1012 buys goods from the retail trade 1000, a sales person sets the IC card 1030 into the reader/writer 1024, withdraws a requested money amount summed by a register operation of the POS terminal 1022 from the electronic money of the IC card 1030, and sends a use notification 1002 to the bank host system 1014 by an on-line. The bank host system 1016 which received the use notification 1002 transfers the notified reception money amount to a retail trade account 1042 from the pool account 1045, and returns a transference completion notification to the POS host system 1020, thereby completing a payment by the electronic money.

Such an electronic money system using the IC card, however, has the following problems. At present, since the issue and management of the IC card is mainly performed by the bank, a preparation burden of necessary equipment becomes a subject in order to enable the transaction by the electronic money of the IC card to be performed. However, even if the necessary equipment are prepared, in the present settlement by the electronic money, an effect corresponding to it cannot be expected as compared with cash or a credit card. Even for a consumer who uses the electronic money services, such services have only a function as a substitution of the cash and different from a case of a bank account, no interest is derived from the electronic money held in the IC card, so that it seems that there is no merit. Further, even for the bank, a new service system has to be constructed for the POS system of the retail trade as a target and the existing system and construction need to be remarkably changed. That is, there are problems such that in association with the electronic money services, a pool money managing process and its withdrawing process are necessary and a construction of the existing system has to be remarkably changed.

SUMMARY OF THE INVENTION

According to the invention, there is provided a transaction method of an electronic money system having an optimum transaction form such that advantages can be provided for all of consumers, retail trades, and banks by electronic money services for performing a cash transaction by using electronic money stored in an IC card.

According to the invention, there is provided a transaction method of an electronic money system for performing a cash transaction by using electronic money stored in a card in which a processor and a memory have been installed, namely, what is called an IC card, wherein the electronic money system is constructed by:

a bank host system of a bank having, for example, an ATM, a CD, and a reader/writer; and a POS host system of the retail trade having a POS terminal and a reader/writer.

A transaction method of an electronic money system of the invention comprises:

a card issuing step of issuing an IC card to a consumer from a retail trade;

a withdrawing step of withdrawing a necessary money amount by the consumer from a self bank account to the IC card and storing therein;

an account transferring step of transferring the same money amount as the withdrawn money amount of the consumer from the bank account of the consumer to a bank account of the retail trade which issued the IC card on the basis of the account withdrawal of the consumer; and a card using step of paying a requested money amount by using the IC card when the consumer buys goods from the retail trade or receives a presentation of services.

In the account transferring step, when the consumer withdraws the money amount to the IC card, the money amount is immediately transferred from the bank account of the consumer to the bank account of the retail trade and the retail trade receives advance money. In the retail trade, therefore, the use of the advance money can be performed and not only a preparation of necessary equipment to construct a system can be easily performed but also a premium service such as discount, point, or the like can be provided for the consumer who possesses the IC card. In the withdrawing step, when the necessary money amount is withdrawn from the bank account to the IC card, the advance information on the IC card is updated. The advance information includes at least an account number, a bank name, an advance money amount, a balance, a use money amount, and a date. The advance information of the IC card further includes security information to check an illegal use of the card. In the account transferring step, when the withdrawn money amount of the consumer is transferred to the bank account of the retail trade, the advance management information of the consumer is recorded on a managing file of the retail trade and is managed. The advance management information of the managing file includes at least a consumer name, a card number, an advance date, a use date, a use money amount, a balance, and a use bank name. In the withdrawing step, when the withdrawn money amount of the consumer is transferred to the bank account of the retail trade, a premium service is provided for the consumer. The premium service is a point service or a discount service.

The card using step has the following procedure:
  a retrieving step of retrieving the advance management information of the card for a settlement request of the IC card;
  a checking step of checking a validity of the IC card; and
  an advance money deleting step of comparing the requested money amount and the advance balance when the IC card is determined to be valid by the checking step and subtracting the requested money amount from the balance and updating the balance when there is a balance exceeding the requested money amount.

When the validity of the IC card cannot be judged in the checking step, impossibility of the use of the IC card is notified. In the advance deleting step, when the requested money amount is less than the advance balance, a balance due is notified. In response to the notification of the balance due, a settlement or the like by the cash, credit card, or another IC card is enabled. In the advance settling step, when the discount service is provided, a discount rate of the advance management information is referred and the money amount in which the discount rate is multiplied to a payment money amount is subtracted from the present balance. In the advance settling step, after completion of the advance deleting process, the advance information of the IC card is updated.

The card using step is characterized by enabling the IC card to be used in a retail trade other than the issuing source of the IC card. When the IC card is used in the retail trade other than the card issuing source, a money amount in which a predetermined extra charge is added to the advance deletion money amount is transferred to the bank account of the retail trade of the card issuing source. The bank accounts of the retail trade and consumer can be bank accounts opened with the same bank or can also include bank accounts opened with different banks. In the card withdrawing step, a necessary money amount is withdrawn to the IC card by using a terminal unit connected to the bank host system. In the card using step, the requested money amount is paid by using a terminal unit of the host system of a retail trade installed in a shop or the like. Further, the advance balances can be exchanged between the different IC cards by using the reader/writer. As advance information of the IC card, further, application information to limit the purchase of goods in accordance with the use application of the card is included. In this case, in the card using step, the use by the purchase of goods adapted to the application information of the card is enabled and the use in the purchase of goods which doesn't correspond to the application information is inhibited.

According to the invention, an electronic money system is provided. The electronic money system is constructed by: an IC card to store a use money amount for goods purchase which was designated from a consumer; a goods management terminal unit for issuing the IC card by an instruction of the consumer and instructing so as to transfer the money amount from a bank account of the consumer to a bank account of a retail trade as a card issuing source; and a transfer processing unit for performing a transferring process between the designated bank accounts when a transference is instructed from the goods management terminal unit. The IC card which is used in the electronic money system includes at least a use money amount for goods purchase which was designated from the consumer, a bank name in which the consumer saves money and from which the use money amount is withdrawn, a bank account number, and a balance.

According to the invention, a goods management terminal is also provided. The goods management terminal is constructed by: a card issuing unit for issuing an IC card in which the use money amount for goods purchase which was designated from a consumer has been stored; a transference instructing unit to instructs a financial agency so as to transfer the money amount from a bank account of the consumer to a bank account of a retail trade as a card issuing source; and a card updating unit for updating a balance of the use money amount in the card when the consumer buys goods by using the IC card.

According to the transaction method of the electronic money system of the invention as mentioned above, the retail trade mainly issues the IC card to the consumer and, further, the transference is executed from the consumer to the retail trade on the same day. Therefore, an advance investment can be performed for the retail trade and not only it is easy to perform a preparation of necessary equipment but also it is possible to add services (discount, point, and the like) more than the present services to the card owner. For the consumer, simultaneously with the withdrawal of the money amount for the IC card, a premium as much as the additional services by the retail trade can be expected. Particularly, when a purchase demand is clearly known, a service more than the bank interest can be expected and its merit is large. Further, for the bank as well, not only such services can be performed within a range of the existing system and construction but also effects such that fixing of the account, business development to the advance investment of the retail trade, and the like can be expected. Moreover, by enabling the money amount to be exchanged between the IC cards, a use efficiency of the consumer can be remarkably raised. In addition, by also enabling the IC card to be used by another store, the use efficiency of the consumer can be extremely raised.

The above and other objects, features, and advantages of the present invention will become more apparent from the following detailed description with reference to the drawings.

BRIEF DESCRIPTION OF THE DRAWINGS

FIG. 10 is a flowchart for a POS host process in FIG. 2;

FIG. 13 is a block diagram of a system form of a sharing-use by a plurality of retail trades.

DETAILED DESCRIPTION OF THE PREFERRED EMBODIMENTS

Figure 1:
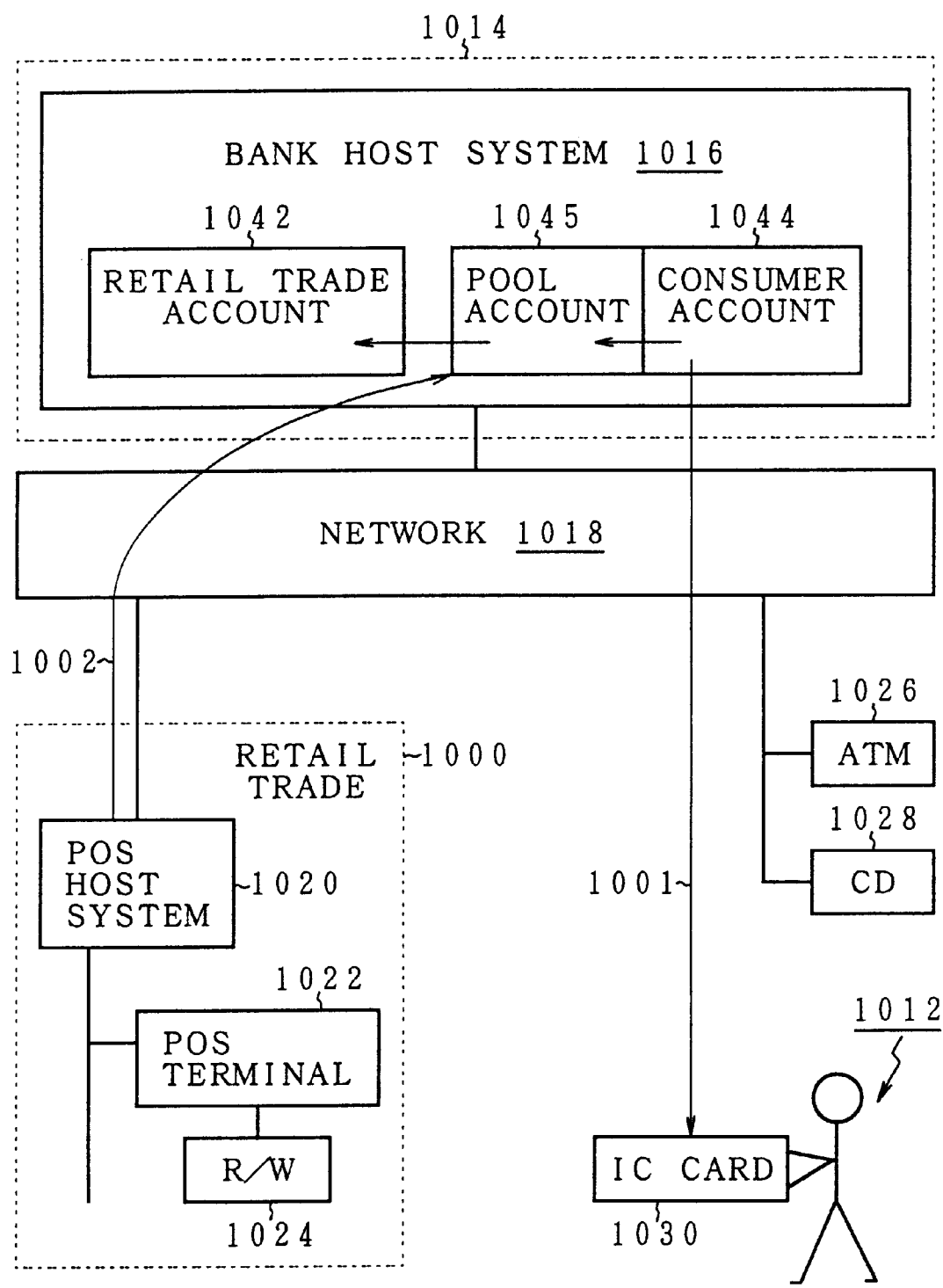
FIG. 1 (PRIOR ART) is an explanatory diagram of a conventional electronic money system.
Figure 2:
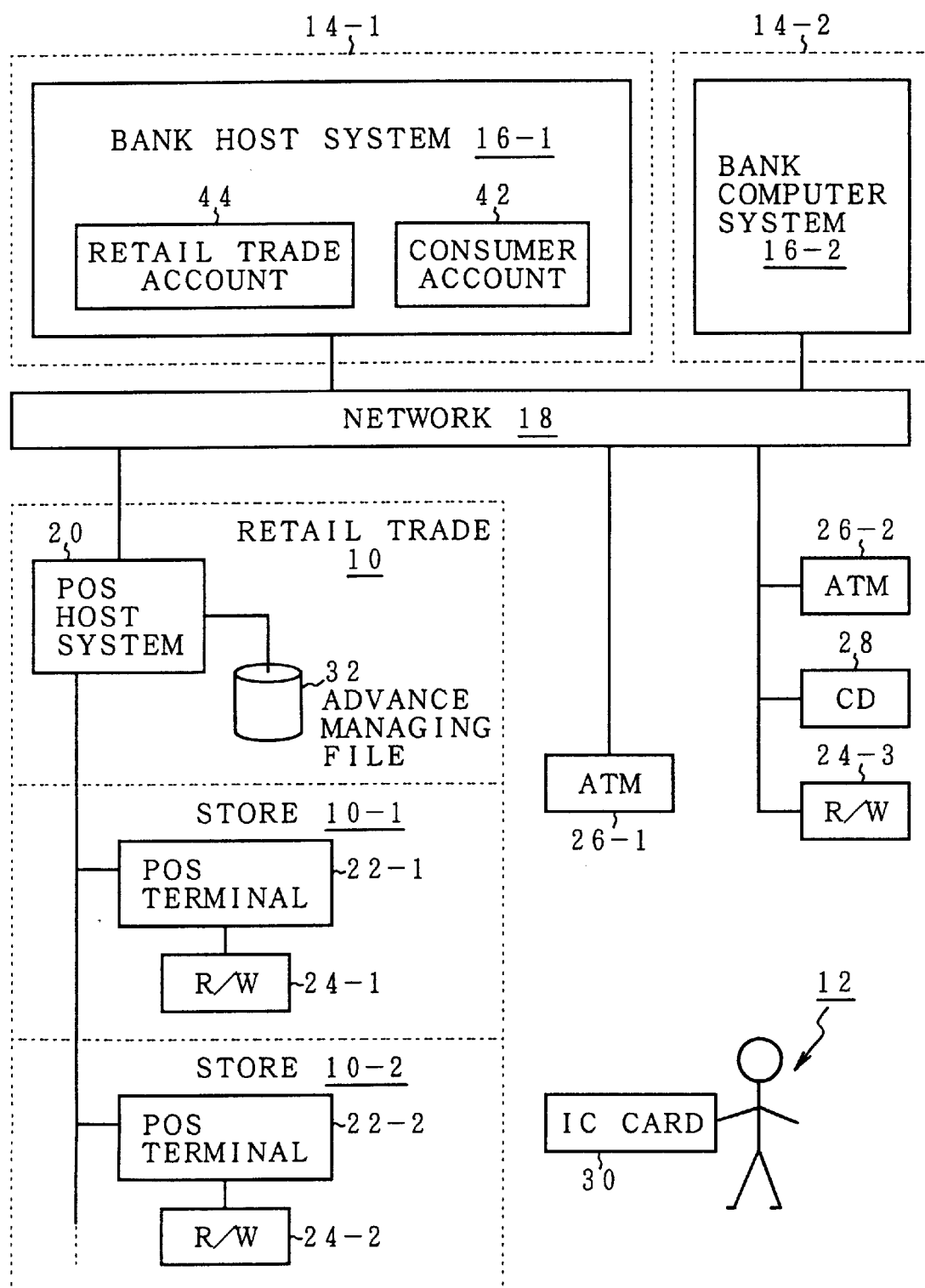
FIG. 2 is a block diagram of a system construction to which the invention is applied.

FIG. 2 is a block diagram of an electronic money system to which a transaction method using electronic money of the invention is applied. The electronic money system as a target of the invention is constructed by three parties comprising: a retail trade 10 such as department store, supermarket, chain store, or the like; a consumer 12; and banks 14-1 and 14-2. For example, the banks 14-1 and 14-2 are the same bank and have bank host systems 16-1 and 16-2, respectively. Terminal devices which are provided by the banks 14-1 and 14-2, for example, ATMs 26-1 and 26-2, a CD 28, and further a reader/writer 24-3 which is used to read or write an IC card 30 are connected to the bank host systems 16-1 and 16-2 through a network 18, respectively. For such a system construction on the side of the banks 14-1 and 14-2 as mentioned above, a POS host system 20 is provided on the side of the retail trade 10. POS terminals 22-1 and 22-2 are connected to the POS host system 20, for example, every stores 10-1 and 10-2 which the retail trade 10 has. In the invention, readers/writers 24-1 and 24-2 which are used to read or write the IC card 30 are connected to the POS terminals 22-1 and 22-2, respectively. An advance managing file 32 is connected to the POS host system of the retail trade 10. The retail trade 10 issues the IC card 30 which is used in the electronic money system to the consumer 12. The IC card 30 is a card which has been standardized by the banks 14-1 and 14-2. The IC card 30 standardized on the bank side is provided for the retail trade 10. On the basis of it, the retail trade 10 issues the IC card 30 to the consumer 12. To realize the transaction method of the electronic money system of the invention, the consumer 12 who received the IC card 30 issued from the retail trade 10 has a consumer account 42 in the bank 14-1. The retail trade 10 also has a retail trade account 44 in the bank 14-1.

A fundamental procedure of the transaction method in the electronic money system in FIG. 2 is as follows.

I. The retail trade 10 issues the IC card 30 to the consumer 12.

II. The consumer 12 withdraws a necessary money amount from the own bank account 42 and stores into the IC card issued from the retail trade 10.

III. When the consumer 12 withdraws the necessary money amount to the IC card 30, the same money amount as the withdrawn money amount is immediately transferred from the consumer account 42 to the retail trade account 44 of the retail trade who issued the IC card 30.

IV. When buying goods or receiving a presentation of services from the retail trade 10, the consumer 12 pays the requested money amount by using the IC card 30.

According to the transaction method of the electronic money system of the invention as mentioned above, the retail trade 10 mainly issues the IC card 30 to the consumer 12 and the consumer 12 who received the issue of the IC card 30 withdraws the necessary money amount from the own consumer account 42 to the IC card 30, thereby using it. When withdrawing to the IC card 30, the same money amount as the withdrawn money amount is simultaneously immediately transferred from the consumer account 42 to the retail trade account 44 as advance money. Thus, at a time point when the consumer 12 withdraws the money amount from the consumer account to the IC card 30, the retail trade 10 can immediately obtain a money receipt of the advance money to the own retail trade account 44. By the immediate money receipt of the advance money, the retail trade 10 can obtain funds for the operation of the advance money and the preparation of necessary equipment and can largely contribute to the spread of the electronic money system of the invention. At the same time, since the retail trade 10 receives the immediate transference of the advance money in association with the withdrawal to the IC card 30 and can obtain surplus funds, consumer services for providing a premium such as discount service, point service, or the like for the consumer 12 who uses the IC card 30 can be realized.

Figure 3:
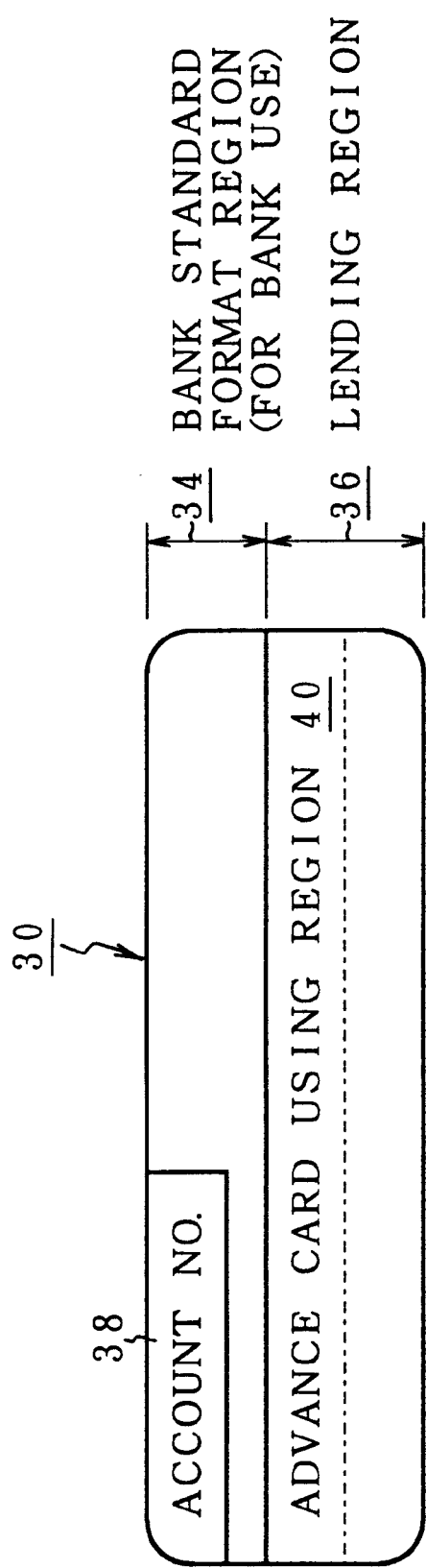
FIG. 3 is an explanatory diagram of an IC card in FIG. 2.

FIG. 3 is an explanatory diagram of the IC card 30 which is used in the electronic money system in FIG. 2. The IC card 30 is a card medium which has been standardized by the bank and is used to process and store information and has therein at least a processor and a memory. By setting the IC card 30 into any one of the ATMs 26-1 to 26-2, readers/writers 24-1 to 24-3, and further CD 28 connected to the bank host system 16-1 side serving as an input/output terminal, terminals provided for the card itself and the terminal unit side are connected, so that a power source is supplied and a transmission path is simultaneously coupled. An ordinary bank transaction such as money receipt, defrayal, savings, transference, or the like can be executed. With respect to a memory region, the IC card 30 has not only a bank standard format region 34 that is used by the bank itself but also a lending region 36 for enabling the use of the third party as shown in the diagram. At least an account number 38 has been stored in the bank standard format region 34 and the other contents conform to a predetermined bank standard format. In the transaction method of the electronic money system of the invention, an advance card using region 40 is allocated to the lending region 36 of the IC card 30 and is used. It is sufficient to provide the account number 38 as information of the bank standard format region 34 necessary to use the advance card using region 40.

Figure 4:
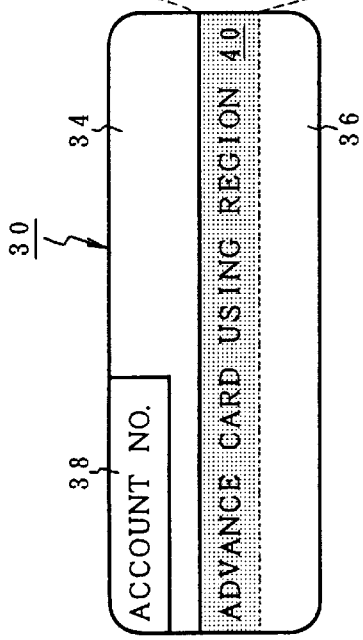
FIG. 4 is an explanatory diagram of advance information stored in the IC card in FIG. 2.

FIG. 4 shows advance information stored in the advance card using region 40 in FIG. 3. In the advance card using region 40 of the IC card 30, as shown in a column of items, there are provided memory regions for advance money amount data D1, withdrawal date data D2, use money amount data D3, first use accumulation data D4, use date data D5, use location data D6, and balance data D7. Subsequent advance money amount data D8, withdrawal date data D9, and second use accumulation data D10 are security information to prevent a falsification of the IC card 30. Further, in order to provide consumer services, regions of point service data D11 and discount service data D12 are provided. The advance money amount D1 is the same as the advance money amount D8 for security. The withdrawal date D2 is the same as the withdrawal date D9 for security. Therefore, when checking the prevention of falsification, the advance money amount D1=D8 and the withdrawal date D2=D9 are discriminated. Although the first use accumulation D4 is the sum of the use money amount from the start of the use of the IC card 30, the second use accumulation D10 for security is cleared every money receipt by the withdrawal from the bank account. When the advance money amount D1=D8 is satisfied, therefore, if it is correct, a value in which the second use accumulation D10 that is cleared every money receipt was added to the balance D7 is equal to the advance money amount D8. That is, D7+D10= D8 is satisfied. Each data of D1 to D12 stored in the advance card using region 40 can be rewritten like attribute information of the updating source on the right side by either one or both of the bank and the POS. That is, a flag 1 indicates a rewriting source and a flag 0 denotes a case where the rewriting cannot be performed. The bank sets the flag 1 with respect to the advance money amount D1, withdrawal date D2, first use accumulation D4, balance D7, advance money amount D8, withdrawal date D9, and second use accumulation D10 and can rewrite the IC card. On the other hand, in the POS host system 20 of the retail trade 10, the flag 1 is set with respect to the use money amount D3, first use accumulation D4, use date D5, use location D6, balance D7, point service D11, and discount service D12 and they can be rewritten. The POS host system 20 executes only the reading operation with respect to the advance money amount D8, withdrawal date D9, and second use accumulation D10 which is cleared every money receipt which are the security information to prevent the falsification. Further, as advance information of the IC card, application information to limit a purchase of goods in accordance with the use application of the card is included. The application information enables only the goods adapted to the application information of the card to be purchased and can inhibit the purchase of goods which are not adapted to the application information. For example, when "study-aid book" is set as application information to the IC card 30 that is issued by a bookstore, when books other than the study-aid book are purchased, its use is limited. Therefore, even if a child is allowed to carry the IC card 30 and to buy some goods, by specifying the application information, the use to purchase unnecessary goods can be limited.

Figure 5:
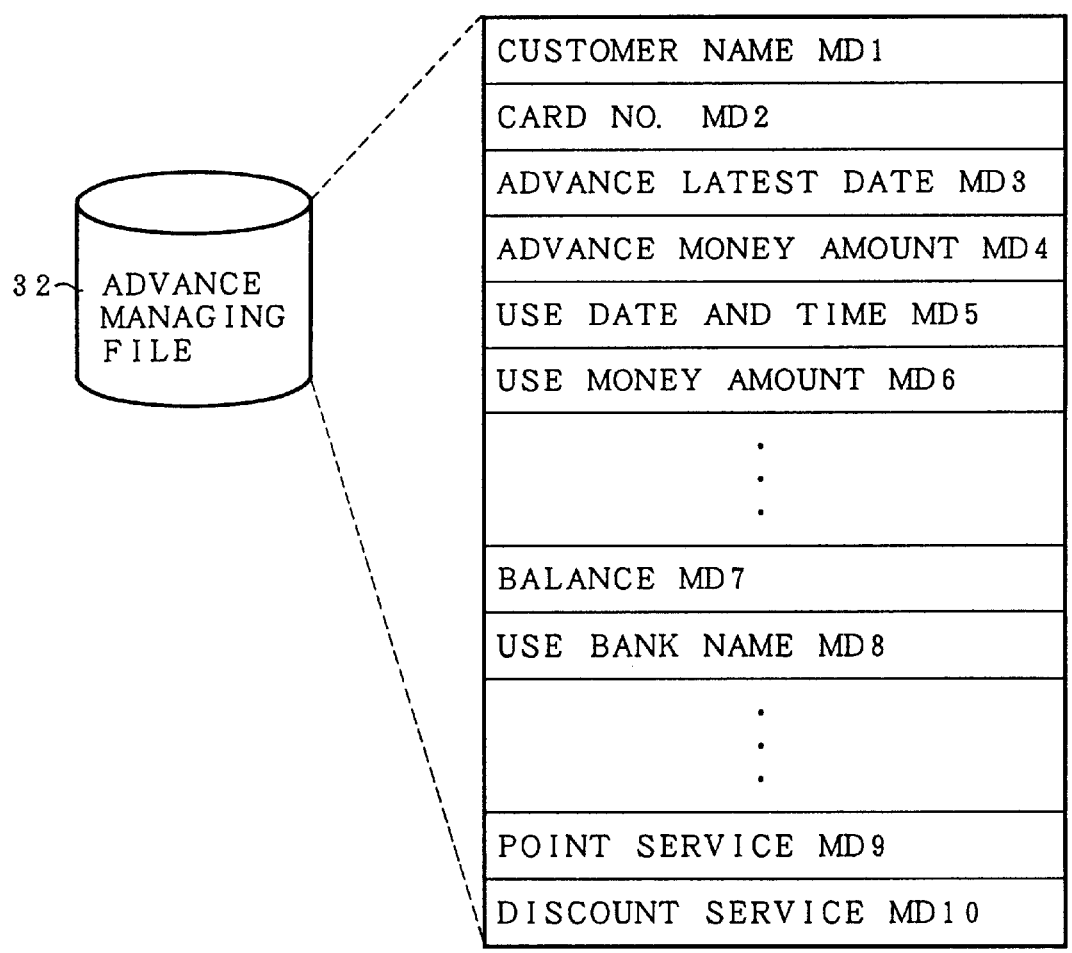
FIG. 5 is an explanatory diagram of an advance managing file provided for a POS host system in FIG. 2.

FIG. 5 is an explanatory diagram of the advance managing file 32 which is provided for the POS host system 20 of the retail trade 10 in FIG. 2. When providing the IC card 30 to the consumer 12, the POS host system 20 of the retail trade 10 assures a file region of the advance management information that is peculiar to the IC card 30 which is issued to the advance managing file 32. As shown in FIG. 5, the advance management information is constructed by a customer name MD1 (master data 1), a card number MD2, an advance latest date MD3, an advance money amount MD4, use date and time MD5, a use money amount MD6, a balance MD7, a use bank name MD8, a point service MD9, and a discount service MD10. Among them, the use date and time MD5 and use money amount MD6 are set to one group and are sequentially formed each time the IC card 30 is used.

Figure 6:
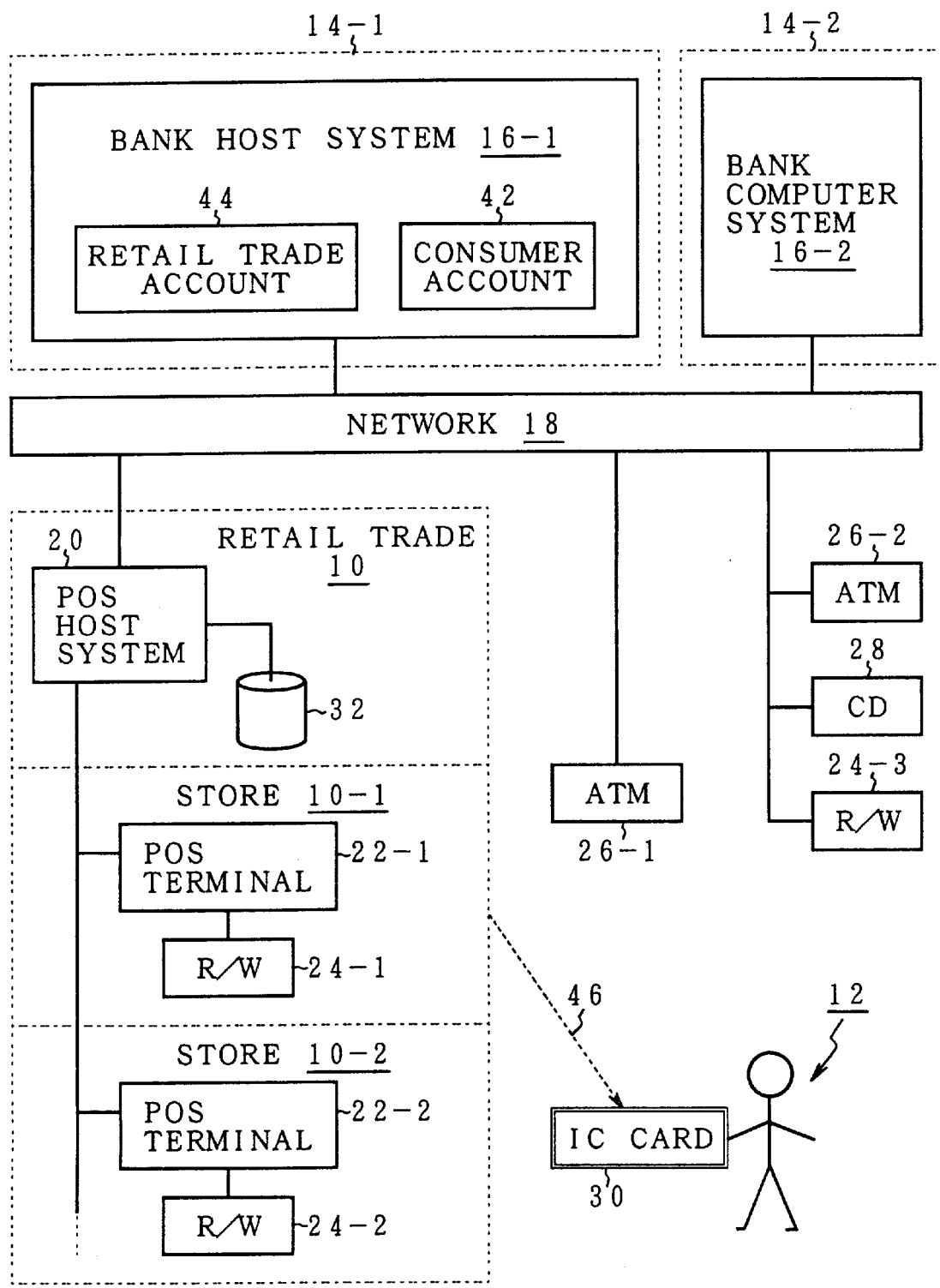
FIG. 6 is an explanatory diagram of an issue of an IC card by a retail trade.

A transaction method according to the invention will now be specifically sequentially explained with respect to the electronic money system of FIG. 2 as an example. FIG. 6 is an explanatory diagram for an issue of an IC card in the transaction method of the invention. According to the retail trade 10, a plurality of IC cards 30 which have previously been supplied from the bank 14-1 side are prepared in the stores 10-1, 10-2, and the like. For example, in the store 10-1, when a certain consumer 12 wants the IC card 30, the IC card is set into the reader/writer 24-1 connected to the POS terminal 22-1 and at least the name of the consumer 12 is asked and written into the IC card 30 by the reader/writer 24-1. In the IC card at the time of the issue, all of the data in the advance card using region 40 in FIG. 4 has initially been cleared. If necessary, although the account number 38 known from the consumer 12 by asking can be written, the account number 38 is ordinarily written when the consumer 12 withdraws the money amount from the own bank account to the IC card 30. When the card is issued, the advance management information region of the IC card 30 to be issued is assured in the advance managing file 32 in FIG. 5. Only the customer name MD1 and card number MD2 are recorded and the other regions are in the clear state.

Figure 7:
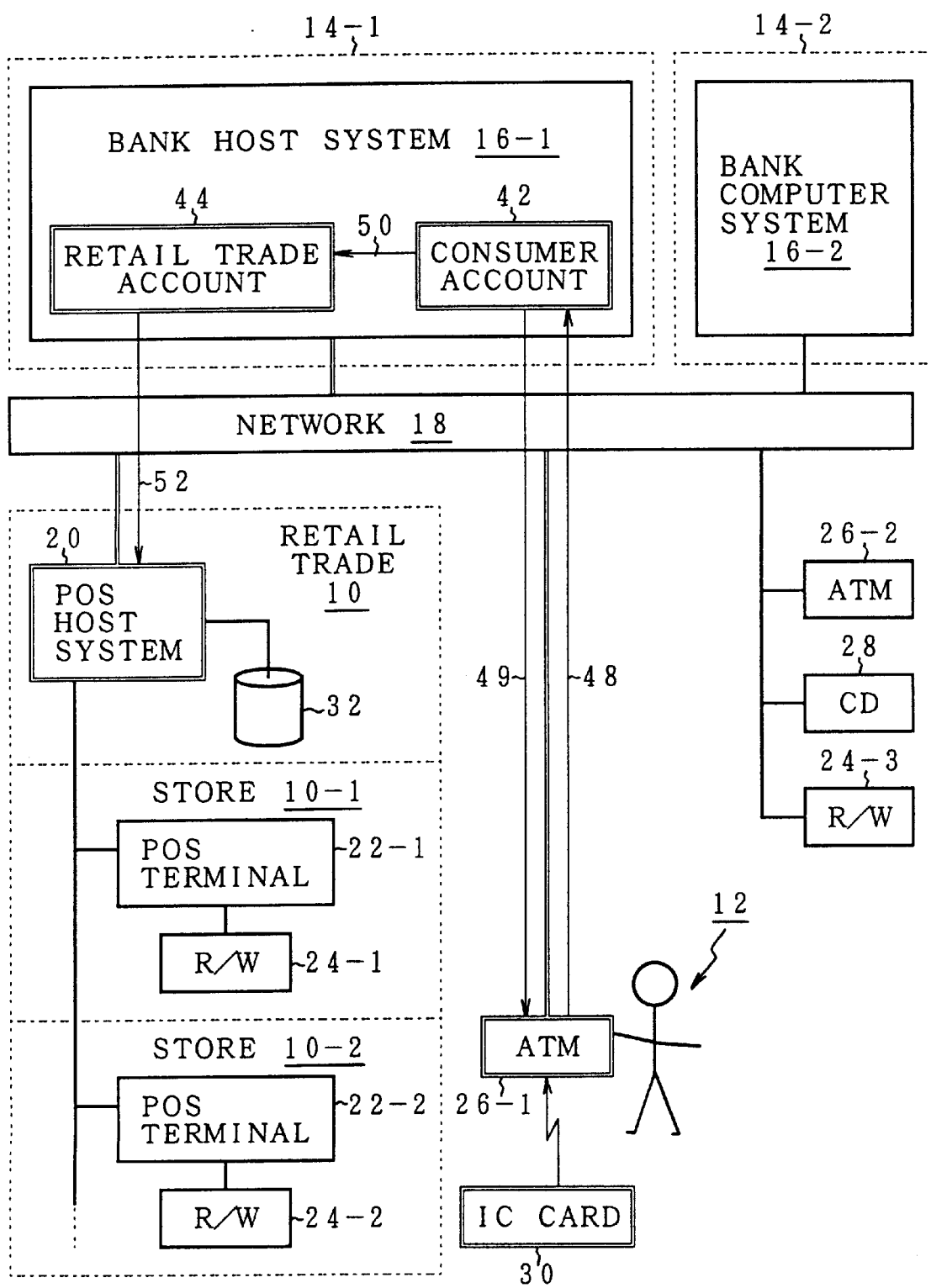
FIG. 7 is an explanatory diagram of an account withdrawal for the IC card.

As mentioned above, the consumer 12 who received a card issue 46 of the IC card from the store 10-1 of the retail trade 10 subsequently withdraws the necessary money amount for the IC card 30 by using the ATM 26-1 of the bank 14-1 installed near the store 10-1 as shown in FIG. 7. It is, therefore, desirable to install the ATM 26-1, CD 28, etc. of the bank host system 16-1 at locations near the stores 10-1 and 10-2 which issue the IC cards 30 as many as possible. The consumer 12 sets the IC card 30 issued from the store 10-1 into the ATM 26-1 and executes a withdrawal request 48 of the necessary money amount for the consumer account 42 opened with the bank 14-1. When the withdrawal request 48 is generated, since the account number and the bank name of the consumer account 42 are inputted, the account number 38 and the bank name are written into the IC card 30 in FIG. 4. The bank host system 16-1 which received the withdrawal request 48 from the ATM 26-1 by the consumer 12 using the IC card 30 writes the withdrawal money amount into the IC card 30 through the ATM 26-1. Thus, the withdrawn money amount is stored into each of the advance money amounts D1 and D8 in the advance card using region 40 in the IC card 30 in FIG. 4. Further, the year, month, and day of the withdrawal are recorded into the withdrawal dates D2 and D9. In this instance, since the use money amount D3 is equal to 0, the same money amount as the advance money amount D1 is recorded in the balance D7. After completion of the withdrawal from the consumer account 42 in response to the withdrawal request 48 between the bank host system 16-1 and the IC card 30 of the consumer 12 using the ATM 26-1 as mentioned above, the bank host system 16-1 performs a same-day transference 50 of the same money amount as the withdrawal money amount to the IC card 30 from the consumer account 42 for the retail trade account 44 of the retail trade 10 which issued the IC card 30. In the same-day transference 50 from the consumer account 42 to the retail trade account 44, a money receipt confirmation notification 52 is performed to the POS host system 20 of the retail trade 10 through the network 18. The POS host system 20 which received the money receipt confirmation notification 52 retrieves the advance managing file 32, retrieves the corresponding advance management information of the IC card 30, and writes the information obtained by the money receipt confirmation notification 52. Namely, with respect to the corresponding advance management information region in the advance managing file 32 in FIG. 3, the advance latest date MD3, advance money amount MD4, balance MD7, and use bank name MD8 are written. Further, when the POS host system 20 provides consumer services, the writing of point information by the calculation of the point service MD9 based on the advance money amount MD4 and the writing of a discount rate of the discount service MD10 are simultaneously executed.

Figure 8:
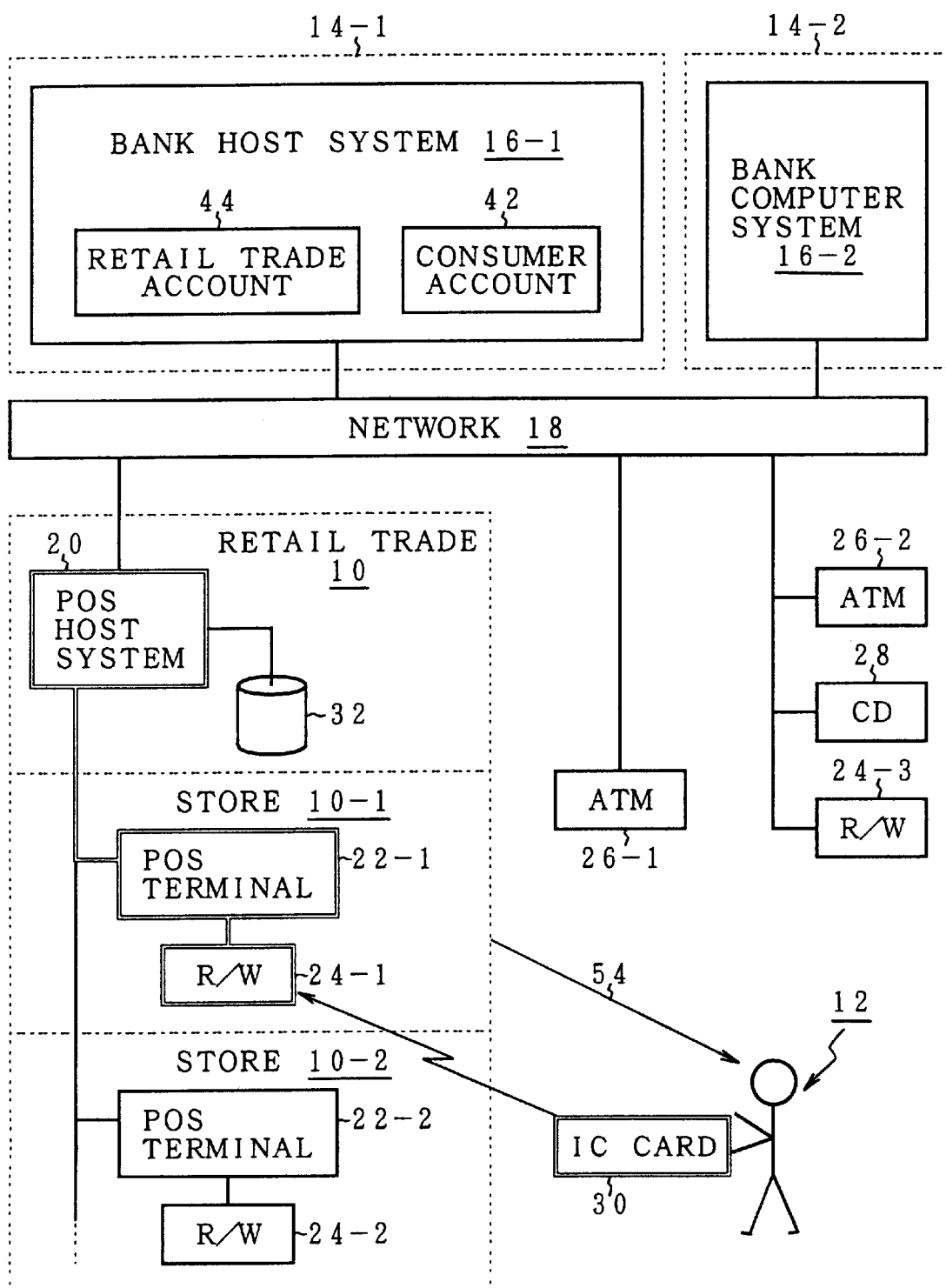
FIG. 8 is an explanatory diagram of an electronic money transaction using an IC card.

After completion of the withdrawal of the necessary money amount for the IC card 30 as shown in FIG. 7, goods are purchased from the store 10-1 by using the IC card 30 and the price is paid by electronic money as shown in FIG. 8. That is, the consumer 12 who performed a purchase 54 of the goods from the store 10-1 presents the IC card 30 to a sales person and sets the IC card into the reader/writer 24-1. In this state, when the sales person executes a register operation of the POS terminal 22-1, a paying process of the electronic money from the IC card 30 based on the collected money amount is performed. Specifically speaking, first, the POS host system 20 requests the customer name MD1 and card number MD2 in response to an access request by the IC card 30 from the reader/writer 24-1. In response to such a request, the POS host system retrieves the advance managing file 32 and reads out the relevant advance management information. Subsequently, the POS host system 20 requires a transfer of security data to check the illegal use of the card to the IC card 30 via the reader/writer 24-1. That is, the POS host system requests the transfer of each of the advance money amounts D1 and D8, withdrawal dates D2 and D9, balance D7, and second use accumulation D10 in FIG. 4. For example, the following conditions are checked.

D1=D8

D2=D9

$D7+D10=D8=D1$

When such security checks succeed, the requested money amount derived by the summing process of the register operation of the POS terminal 22-1 is received and it is compared with the balance D7 in the IC card 30. When the requested money amount is less than the balance, since there is no balance due, the management information in the advance managing file 32 is updated. Namely, the requested use money amount is subtracted from the present balance MD7 in FIG. 3 and the result is written as a new balance MD7. At the same time, the new use date and time MD5 and new use money amount MD6 are written. When the discount service is provided, the discount rate is read out from the discount service MD10 and a value obtained by multiplying the discount amount to the requested amount is subtracted as a requested money amount from the balance MD7, thereby updating the balance MD7. In the POS host system 20, when the requested money amount exceeds the balance in the management information of the advance managing file 32, the lack amount is calculated and notified to the POS terminal 22-1. The sales person receives a message display of the balance shortage to the POS terminal 22-1 and notifies the consumer 12 of a payment of the lack money amount. The payment of the lack money amount can be performed by cash or a credit card or another IC card which the consumer has. When the POS host system 20 normally finishes an advance deleting process by the withdrawal of the requested money amount, the updated information is transferred to the IC card 30 set in the reader/writer 24-1, thereby updating the information in the advance card using region 40 recorded in the IC card 30. Namely, with respect to the advance information in FIG. 4, the rewriting of the use money amount D3, updating of the first use accumulation D4, writing of the use date D5, writing of the use location D6, updating of the balance D7, updating of the point service D11, and updating of the discount service D12 are executed. Referring again to FIG. 7, when the updating of the IC card 30 by the transfer data from the POS host system 20 is finished and a response of the normal end is received, the POS host system 20 executes a sales summing process by the electronic money paid by the IC card 30 and finishes a series of processes.

Figure 9:
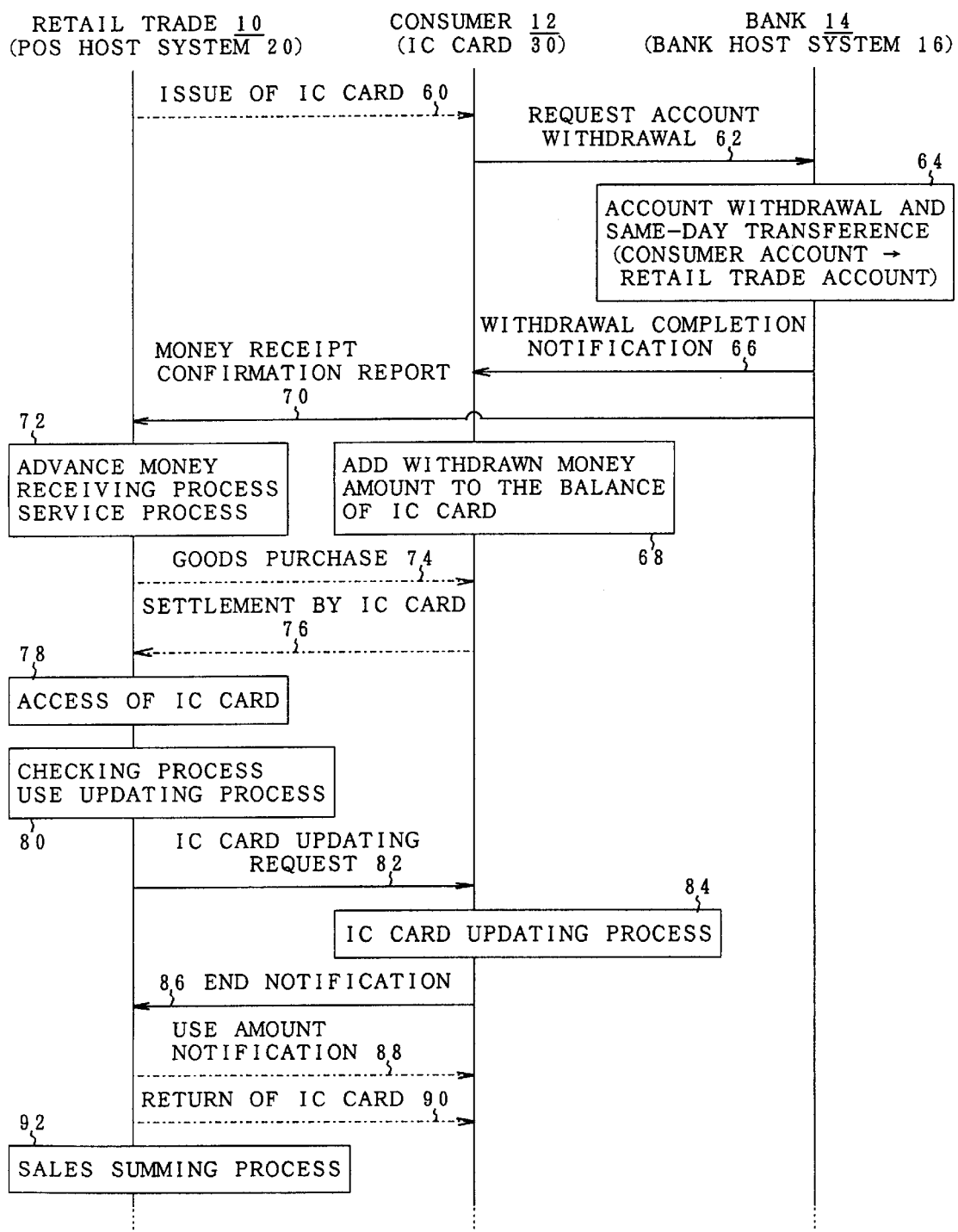
FIG. 9 is a time chart for the operation of the system in FIG. 2.

FIG. 9 is a time chart showing the processes from the issue to the use of the IC card shown in FIGS. 6, 7, and 8 with respect to the mutual transaction among the retail trade 10, consumer 12, and bank 14. A process shown by a broken line is an artificial behavior and a solid line indicates an on-line process by the electronic money system. First, the retail trade 10 performs an IC card issue 60 to the consumer 12. By receiving the IC card issue 60, the consumer 12 executes an account withdrawal request 62 to the bank 14. In response to the account withdrawal request 62, as shown in block 64, a bank host system 16 of the bank 14 executes a withdrawal of the requested money amount to the IC card 30 and a same-day transferring process of the same money amount from the consumer account to the retail trade account. When the bank host system 16 finishes the withdrawing process for the IC card 30 in block 64, a withdrawal completion notification 66 is performed. In response to it, the IC card 30 of the consumer 12 executes a process for adding the withdrawal money amount to the present balance of the IC card in block 68. When the same-day transferring process from the consumer account to the retail trade account in block 64 is finished, the bank host system 16 executes a money receipt confirmation report 70 to the POS host system 20 of the retail trade 10. In response to it, the POS host system 20 of the retail trade 10 executes an advance money receiving process and a service process to the consumer 12 in block 72. Subsequently, it is now assumed that the consumer 12 performed a goods purchase 74 in a store or the like of the retail trade 10 and requested a settlement 76 of the IC card. In response to it, in the retail trade 10, the IC card 30 is set into the reader/writer and the access of the IC card by the POS host system 20 is executed in block 78. Subsequent to the access, a checking process to discriminate the presence or absence of the illegal use of the IC card 30 is executed in block 80. When the checking process succeeds, the requested money amount is withdrawn from the electronic money of the IC card and a use updating process to update the advance management information is executed. After completion of the process on the POS host system 20 side, an IC card updating request 82 is performed to the IC card 30. In block 84, an updating process of the advance information is executed on the IC card 30 side. When the updating process on the IC card 30 side is normally finished, an end notification 86 is performed to the POS host system 20. The POS host system 20 allows the POS terminal to print out the use money amount. On the basis of the print result, a use amount notification 88 is performed from the retail trade 10 side to the consumer 12 by a receipt or the like. The IC card 30 after completion of the use is returned (90). When the above processes are finished, the POS host system 20 executes the sales summing process to the accounting system on the retail trade 10 side by the electronic money which was paid by the IC card 30 in block 92.

Figure 11:
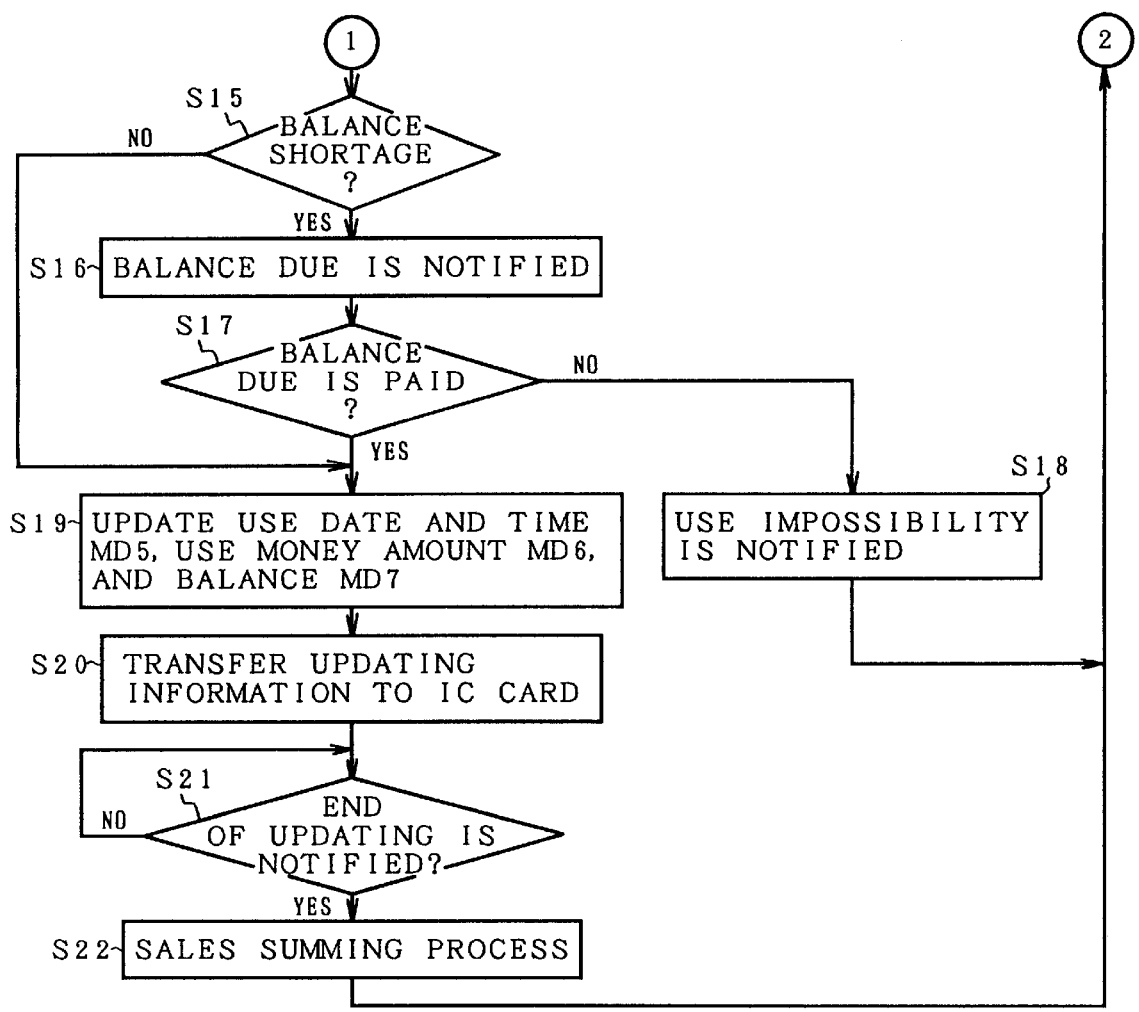
FIG. 11 is a flowchart for the POS host process subsequent to FIG. 10.

FIG. 10 is a flowchart for processes of the POS host system 20 provided for the retail trade 10 in FIG. 2. First in step S1, the presence or absence of the input of the issue of an IC card is checked. When the IC card is issued from the retail trade to the consumer, in response to such an inputting operation, the management region of the IC card issued is prepared in the advance managing file 32 in step S2. In step S3, the presence or absence of the money receipt confirmation notification from the bank host system 16-1 is checked. If the consumer 12 withdraws the necessary money amount from the consumer account 42 for the IC card 30 and receives the money receipt confirmation notification by the completion of the same-day transference to the retail trade account 44 in association with it, the advance managing file 32 is retrieved in step S4. When the corresponding information is found out in step S5, with respect to the corresponding advance management information, for example, the date, advance money amount, balance, and the like are updated as shown in step S6. Further, a consumer service process such as point service, discount service, or the like is executed in step S7. When there is no corresponding information in step S5, an ordinary money receiving process is executed in step S8. In step S9, the presence or absence of a use request of a use situation of the IC card is checked. When the use request by setting the IC card 30 into the reader/writer 24-1 is discriminated from the POS terminal 22-1 or the like provided in the store or the like, information to check the falsification is first requested in step S10. In step S10, as a falsification checking process, for example, with respect to the data shown in FIG. 4, a check is made to see if the conditions such that D1=D8, D2=D9, $D7+D10=D8$, and the like are satisfied. In step S12, when the conditions as targets of the checking process are satisfied, it is judged that the checking process succeeds. In step S13, the requested money amount, namely, the use money amount summed on the POS terminal 22-1 side is inputted. In step S12, when the checking process fails as a result of the falsification checking process, the use impossibility is notified in step S14. The processing routine advances to step S15 in FIG. 11 and the presence or absence of a balance shortage is judged. If there is a balance shortage, the lack money amount is notified to the POS terminal side in step S16. In step S17, the system waits for the receipt of the lack money amount. If there is no money receipt of the lack amount even after the money receipt of the lack money amount was requested for a predetermined time or a predetermined number of times, step S18 follows and the use impossibility by the IC card is notified. If the lack money amount is received in step S17 or if there is no balance shortage in step S15, step S19 follows. The use date and time MD5, use money amount MD6, balance MD7, and the like in the corresponding advance management information in the advance managing file 32 in FIG. 5 are updated. In step S20, the updating information is transferred to the IC card 30, thereby updating the relevant information. When an end of updating notification is received in step S21, the sales summing process of the sales money amount paid by the electronic money of the IC card 30 is executed in step S22.

Figure 12:
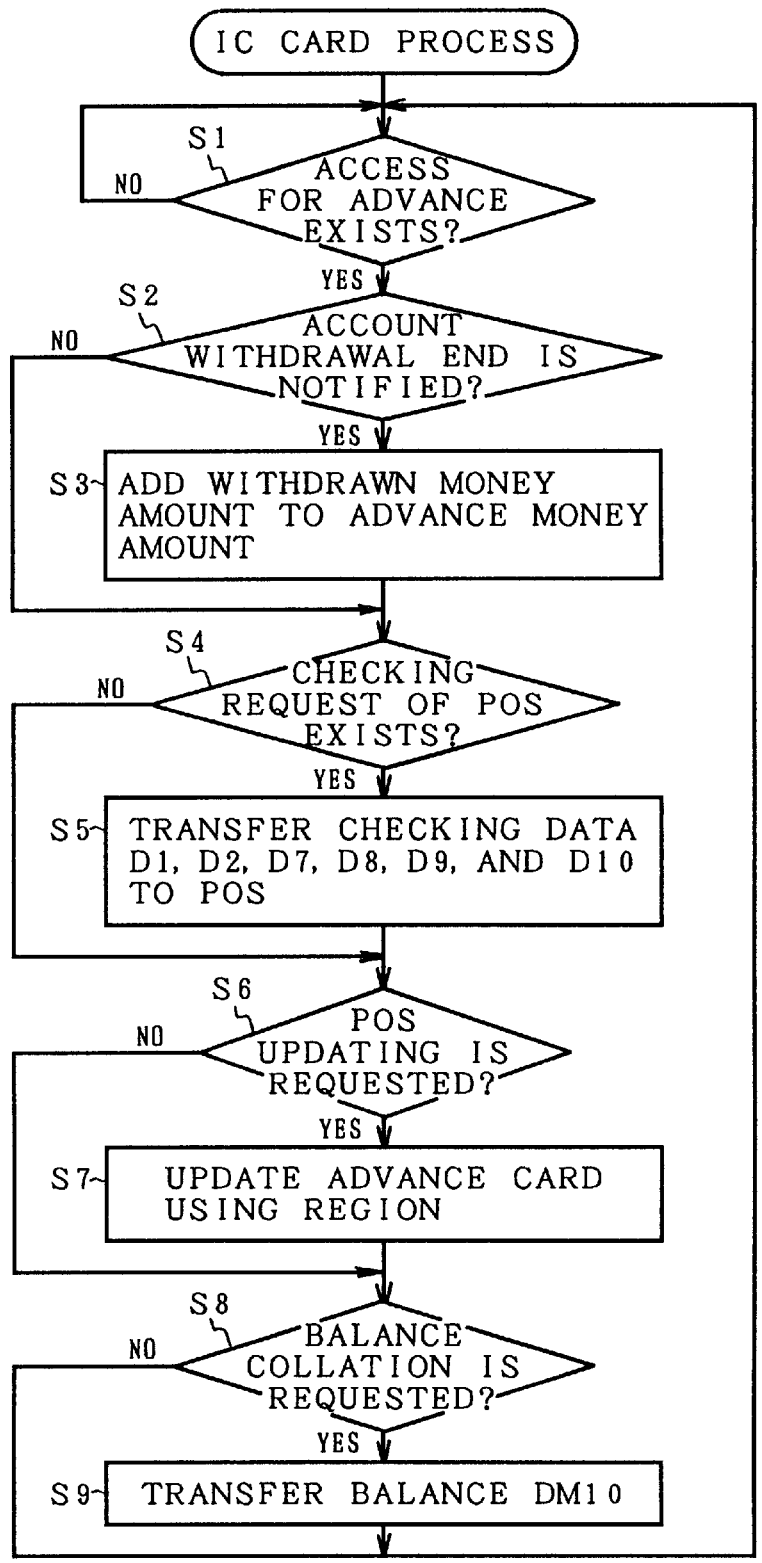
FIG. 12 is a flowchart for an IC card process in FIG. 2.

FIG. 12 is a flowchart for processes on the IC card 30 side which is used in the electronic money system in FIG. 2. First in step S1, the presence or absence of the access for advance by setting the IC card into the ATM or the like of the bank host system 16-1 is judged. In step S1, the execution of the access for advance to withdraw the necessary money amount from the consumer account 42 of the bank host system 16-1 to the IC card 30 is discriminated, the system waits for the account withdrawal end notification in step S2. When receiving the account withdrawal end notification, the withdrawal money amount is added to the advance money amount in step S3. The information other than the withdrawal money amount in association with the withdrawal is also recorded. In step S4, the presence or absence of the checking request by the POS host system 20 is judged. When the IC card 30 is set to the POS terminal 22-1 or the like installed in the store or the like of the retail trade 10, since a checking request is performed from the POS host system 20, it is discriminated and step S5 follows. For example, the data D1, D7, D8, D9, D10, and the like shown in FIG. 4 are transferred as check data to the POS host system 20. Subsequently, the presence or absence of a POS updating request is judged in step S6. When the advance money deleting process by the electronic money is completed on the POS host system 20 side, the updating information is sent to the IC card side. Therefore, it is discriminated and the necessary information is updated for the advance card using region of the IC card in step S7. Further, there is a case where the IC card is set into the reader/writer installed in a store, a bank, or the like and a balance inquiry is requested. In such a case, step S9 follows and the balance MD7 stored in the IC card is transferred to the reader/writer, thereby allowing the present balance of the electronic money to be displayed.

FIG. 13 shows another embodiment of a transaction method of the electronic money system of the invention and is characterized in that an IC card issued by a certain retail trade can be also used by a retail trade other than the issuing source of the card. The POS host system 20 of the retail trade 10 and a POS host system 200 of another retail trade 100 are connected to the bank host system 16 of the bank 14 through the network 18. The retail trades 10 and 100 open retail trade accounts 44 and 440 with the bank host system 16. It is now assumed that the store 10-1 of the retail trade 10 issued the IC card 30 to the consumer 12. In order to enable the IC card 30 issued by the retail trade 10 to be used by another retail trade 100, a mutual use contract 300 of the IC card 30 has previously been made between the retail trades 10 and 100. The transfer of the money amount between the retail trade accounts 44 and 440 in the bank host system 16 by the mutual use contract 300 is realized by application programs of the POS host systems 20 and 200 provided for the retail trades 10 and 100. The bank host system 16 side is not aware of the mutual use contract 300. As applications of the POS host systems 20 and 200 when the mutual use contract 300 is made, when there is a use by the IC card 30 which is not issued by the retail trade itself, the retail trade receives the payment of the consumer 12 by substantially the same electronic money as that of the IC card 30 issued by itself. After the end of the payment, a use notification is notified to the issuing source of the IC card 30 via the bank host system 16. In response to the use notification, the money amount obtained by adding a commission as a predetermined extra charge to the use money amount is transferred to the bank account of the use destination from the bank account of the issuing source.

FIG. 13 will now be specifically explained as follows. Now, the retail trade 10 issues the IC card 30 to the consumer 12, the consumer 12 withdraws from the consumer account 42 to the IC card 30 by using the ATM 26, and in response to it, the advance money receipt by the immediate transference of the same money amount as the withdrawal money amount is performed to the retail trade account 44 of the issuing source. As mentioned above, it is now assumed that the consumer 12 having the IC card 30 issued from the retail trade 10 bought goods in a store 200-1 of another retail trade 10 which had made the mutual use contract 300 and paid by the IC card 30. In response to the payment by the IC card 30, the POS host system 200 of the retail trade 100 receives the payment of the electronic money by the IC card 30 by the execution of the application programs according to the mutual use contract 300 and, at the stage of the end of the payment, a use notification 500 by the IC card 30 is executed to the POS host system 20 of the issuing source via the network 18. The POS host system 20 of the card issuing source which received the use notification 500 of the IC card 30 from the other retail trade 100 generates a transfer request 502 based on the notified use money amount to the retail trade account 44 of the bank host system 16. The bank host system 16 which received the transfer request 502 performs a transference 504 of the money amount obtained by adding a commission as a predetermined extra charge to the use amount of the IC card 30 to the retail trade account 440 of the retail trade 100 designated as a transference destination. The transference 504 is executed by using the advance money which was transferred in the same-day when the money amount is withdrawn from the consumer account 42 to the IC card 30.

According to the invention as described above, the retail trade mainly issues the IC card and simultaneously with the withdrawal to the IC card by the consumer, the advance money receipt is immediately executed by the transferring process to the retail trade as an issuing source. Therefore, the retail trade can operate the advance money. Not only it is possible to easily use the funds for preparation of equipment necessary to the electronic money system but also a premium service such as discount, point, or the like can be performed to the card owner. Simultaneously with the withdrawal of the money amount necessary to the IC card issued, the consumer can expect a premium as much as an additional service by the retail trade as a card issuing source. Particularly, when goods to be bought by the consumer are clear, a premium such as discount, point, or the like is realized by using the IC card, so that a merit more than the bank interest can be expected. Further, for the bank, such a system can be realized within the construction of the existing system having the equipment corresponding to the IC card. By previously opening the consumer account and the retail trade account with the same bank in principle, the accounts can be fixed. Even if the transaction by the electronic money is performed, an outflow of funds to the outside of the bank fundamentally doesn't occur. Moreover, by providing the advance money receipt to the retail trade, an effect of a business development of the advance investment can be largely expected.

Although the above embodiment has been shown and explained with respect to the case where the consumer account and the retail trade account have been opened with the same bank as an example, with respect to a retail trade account and a consumer account which are opened with other different banks as well, the present invention can be applied through an on-line network between the banks in substantially the same manner. Although the above embodiment has been shown and explained with respect to the reader/writer, as an example, fixedly installed in the retail trade or bank as a reader/writer that is used to inquire a balance or the like of the IC card, a portable reader/writer can be also used. According to the portable reader/writer, although an on-line communication between the POS host system of the retail trade and the bank host system cannot be performed, a perusal of recording information such as a balance or the like of the IC card or an exchange of stored money amounts among a plurality of IC cards can be performed. The exchange of the money amounts among the IC cards can be easily realized by a method whereby an IC card of an exchanging source is set into the portable reader/writer and a money amount is withdrawn and, subsequently, an IC card of an exchange destination is set and a money amount receipt is performed.

What is claimed is:

1. A transaction method of an electronic money system for performing a cash transaction by using electronic money stored in a card in which a processor and a memory are installed, comprising:

a card issuing operation of issuing the card from a retail trade to a consumer, the card having a bank standard format region;

an account transfer operation of transferring the same amount of money as that withdrawn via the card from a bank account of the consumer into a bank account of the retail trade at the time when the consumer withdraws a necessary amount of money via the card from the bank account of the consumer, such that a maximum amount of money that may be withdrawn via the card is equal to the amount of money in the consumer bank account; and a card using operation of paying a requested money amount only to the retail trade with the card when the consumer buys goods or receives a presentation of a service from the retail trade such that the requested money amount is received into a bank account of the retail trade during the same day that the card is issued.

2. A method according to claim 1, wherein in said account transfer operation, when the necessary money amount is withdrawn via the card, advance management information on the card is updated.

3. A method according to claim 2, wherein the card comprises at least an account number, a bank name, an advance money amount, a balance, a use money amount, and a date as the advance management information.

4. A method according to claim 3, wherein as the advance management information of the card, security information to check an illegal use of the card is further comprised.

5. A method according to claim 3, wherein:

application information to limit a purchase of goods in accordance with a use application of the card is further comprised as the advance management information of the card; and in said card using operation, the use by a goods purchase adapted to the application information of the card is enabled, and the use by a goods purchases, which is not adapted to the application information, is inhibited.

6. A method according to claim 1, wherein in said account transfer operation, when the withdrawal money amount of the consumer is transferred to the bank account of the retail trade, advance management information of the consumer is recorded onto a managing file of the retail trade and is managed.

7. A method according to claim 6, wherein the advance management information of the managing file comprises at least a consumer name, a card number, an advance date, a use date, a use money amount, an advance balance, and a use bank name of the consumer bank.

8. A method according to claim 6, wherein in said card using operation, when a discount service is provided, a discount rate of the advance management information is referred and a money amount obtained by multiplying the discount rate to the requested money amount is subtracted from a present balance.

9. A method according to claim 1, wherein in said withdrawing operation, when a withdrawal money amount of the consumer is transferred to the bank account of the retail trade, a premium service is provided to the consumer.

10. A method according to claim 9, wherein the premium service is a point service or a discount service.

11. A method according to claim 1, wherein said card using operation comprises:

a retrieving operation of retrieving advance management information of the card in response to a settlement request of the card;

a checking operation of checking a validity of the card; and an advance money deleting operation of subtracting a requested money amount from a balance and updating the balance in the case where when a check result succeeds in said checking operation, the requested money amount is compared with the advance balance and there is a balance exceeding the requested money amount.

12. A method according to claim 11, wherein when the validity of the card cannot be discriminated in said checking operation, a use impossibility of the card is trade other than a card issuing source.

13. A method according to claim 11, wherein in said advance money deleting operation, when the requested money amount is less than an advance balance, a balance due is notified.

14. A method according to claim 13, wherein in said advance money deleting operation, in response to a notification of the balance due, a settlement or the like by cash, a credit card, or another card is enabled.

15. A method according to claim 11, wherein in said advance money deleting operation, when said advance money deleting operation is completed, advance management information of the card is updated.

16. A method according to claim 1, wherein in said card using operation, the card can be used by a retail trade other than a card issuing source.

17. A method according to claim 16, wherein when the card is used by the retail trade other than the card issuing source, a money amount obtained by adding a predetermined extra charge to an advance deleting money amount is transferred to the bank account of the retail trade as a card issuing source.

18. A method according to claim 1, wherein:
in said account transfer operation, the withdrawal is performed to the card by using a terminal unit connected to a host system; and
in said card using operation, a requested money amount is paid by using a terminal unit of a host system of a retail trade installed in a shop or the like.

19. A method according to claim 1, wherein an advance balance is exchanged between different cards by using a reader/writer.

20. An electronic money system, comprising:
a card, issued from a retail trade to a consumer, to store a use money amount for a goods purchase designated from the consumer, the card having a bank standard format region;
a goods management terminal unit for using the card in response to an instruction of the consumer and for instructing transfer of the money amount from a bank account of the consumer into the issued card during the same day that the card is issued such that a maximum amount of money that may be transferred into the card is equal to the amount of available money in the consumer bank account; and
a transference processing unit for performing a transferring process when the transference is instructed from said goods management terminal unit such that only the retail trade receives the money amount into a bank account of the retail trade during the same day that the card is issued.

21. A system according to claim 20, wherein the card comprises at least a use money amount for a goods purchase designated from the consumer, a bank name of the first bank in which the consumer saves and from which a use money amount is withdrawn, a bank account number, and a balance.

22. A goods management terminal, comprising:
a card issuing unit for issuing a card from a retail trade to a consumer in which a use money amount for a goods purchase designated from a consumer has been stored, the card having a bank standard format region;
a transference instructing unit for instructing a financial agency to transfer the money amount from a bank account of the consumer into the issued card during the same day that the card is issued; and
a card updating unit for updating a balance of the use money amount in the card only when the consumer buys goods by using the card at the retail trade,
wherein a maximum amount of money that may be withdrawn via the card is equal to the amount of money in the consumer bank account, and said transference instructing unit transfers the money amount into a bank account of the retail trade during the same day that the card is issued.

23. A transaction method of an electronic money system for performing a cash transaction, comprising:
a card issuing operation of issuing a card from a retail trade to a consumer, wherein the card stores electronic money by using a processor and a memory, and the card has a bank standard format region;
a withdrawing operation of withdrawing a money amount by the consumer from a bank account of the consumer and depositing the money amount into the issued card during the same day that the card is issued, such that a maximum amount of money that may be withdrawn via the card is equal to the amount of money in the consumer bank account; and
a card using operation of using the card by the customer to purchase goods or services only from the retail trade by paying a purchase money amount corresponding to the goods or services to be purchased, such that the retail trade receives the money amount into a bank account of the retail trade during the same day that the card is issued.

24. A transaction method of an electronic money system for performing a cash transaction by using electronic money stored in a card in which a processor and a memory are installed, comprising:
a card issuing operation of issuing the card from a retailer to a consumer, the card having a bank standard format region;
an account transfer operation of using the issued card to withdraw and transfer money from an interest bearing bank account of the consumer into a bank account of the retailer; and
a card using operation of using the issued card to buy goods or services from the retailer such that the retailer receives the requested money into a bank account of the retailer during the same day that the card is issued.

25. A transaction method of an electronic money system, comprising:
a card issuing operation of issuing a card from a retailer to a consumer, the card having a processor, a memory, and a bank standard format region, such that electronic money may be stored in the card;
an account transfer operation of using the issued card to withdraw and transfer money from an interest bearing bank account of the consumer into a bank account of the retailer, and transferring money from a bank account of the retailer into the card itself, and
a card using operation of using the issued card to buy goods or services from the retailer such that the retailer receives the requested money into a bank account of the retailer during the same day that the card is issued and used.

* * * * *